July 12, 1932.　　　L. HAMMOND　　　1,867,315
SYNCHRONOUS MOTOR
Filed July 30, 1930　　3 Sheets-Sheet 1

Inventor
Laurens Hammond
By Williams, Bradbury, McCaleb & Hinkle
Attys.

July 12, 1932.   L. HAMMOND   1,867,315
SYNCHRONOUS MOTOR
Filed July 30, 1930    3 Sheets-Sheet 2

Inventor
Laurens Hammond
By Williams, Bradbury, McCabe & Hinkle
Attys.

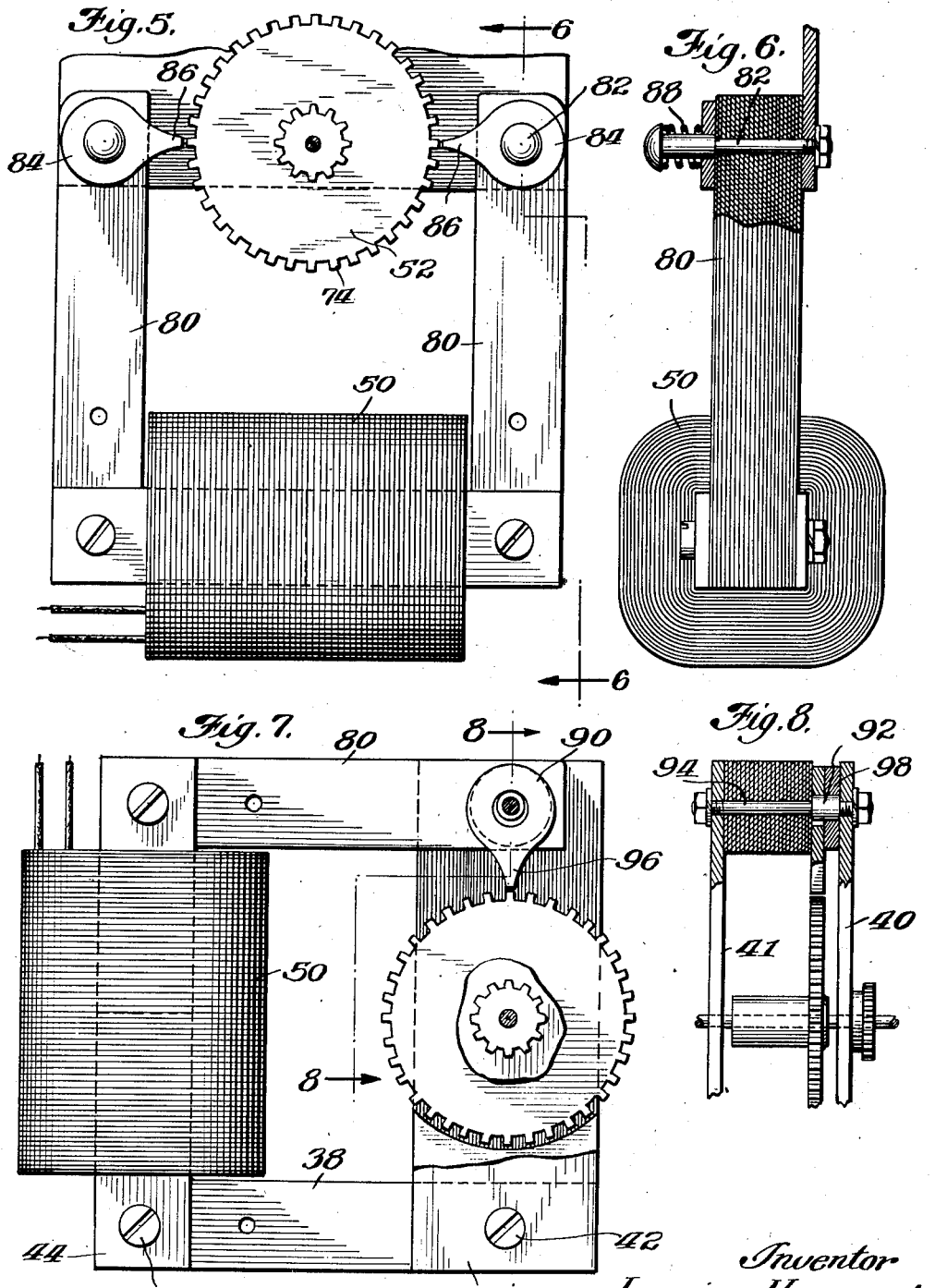

Patented July 12, 1932

1,867,315

UNITED STATES PATENT OFFICE

LAURENS HAMMOND, OF EVANSTON, ILLINOIS, ASSIGNOR TO THE HAMMOND CLOCK COMPANY, OF CHICAGO, ILLINOIS, A CORPORATION OF DELAWARE

SYNCHRONOUS MOTOR

Application filed July 30, 1930. Serial No. 471,656.

My invention relates generally to synchronous motors, and more particularly to improvements in the so-called Tesla type of motor, which will cause such motors readily to fall into step when launched at super-synchronous speed and which will prevent undesirable hunting.

It is a well-known fact that alternating current synchronous motors having an unwound rotor will, if launched at exactly synchronous speed, continue in operation at synchronous speed for some time until, due to slight irregularity in the current supply or upon a slight change in the load, they will stop. Such motors, if launched at super-synchronous speed, will gradually decelerate to a stand-still unless some means, such as disclosed in my Patent No. 1,719,805, July 2, 1929, is provided to dissipate energy as the rotor reaches synchronous speed and is forcibly attracted by the poles of the stator.

My present invention is an improvement upon or a modification of the invention disclosed in my said patent and has for one of its objects the provision of an improved synchronous motor in which the field poles are movably mounted, while the field coil is stationary.

A further object is to provide an improved synchronous motor in which the field poles are pivoted about the same axis as the rotor and are capable of comparatively great angular movement about said axis.

A further object is to provide an improved synchronous motor of the above-mentioned type which is self-starting.

Other objects will appear from the following description, reference being had to the accompanying drawings, in which:

Fig. 5 is a front elevation of a modified form of motor;

Fig. 6 is a sectional view thereof taken on the line 6—6 of Fig. 5;

Fig. 7 is a front elevation of a second modified form of motor; and

Fig. 8 is a fragmentary sectional view taken on the line 8—8 of Fig. 7.

The motor of my present invention is particularly adapted for driving comparatively light loads such, for example, as are present in clocks, time stamps, small time switches and similar devices which are to be continuously operated at a uniform speed. When the motor is supplied with alternating current from a source, the frequency of which is carefully regulated as is now common in most generating stations, the motor will, of course, serve as a time measuring instrument, the degree of accuracy of which will depend only upon the accuracy of the frequency regulation at the alternating current source.

Figure 1:
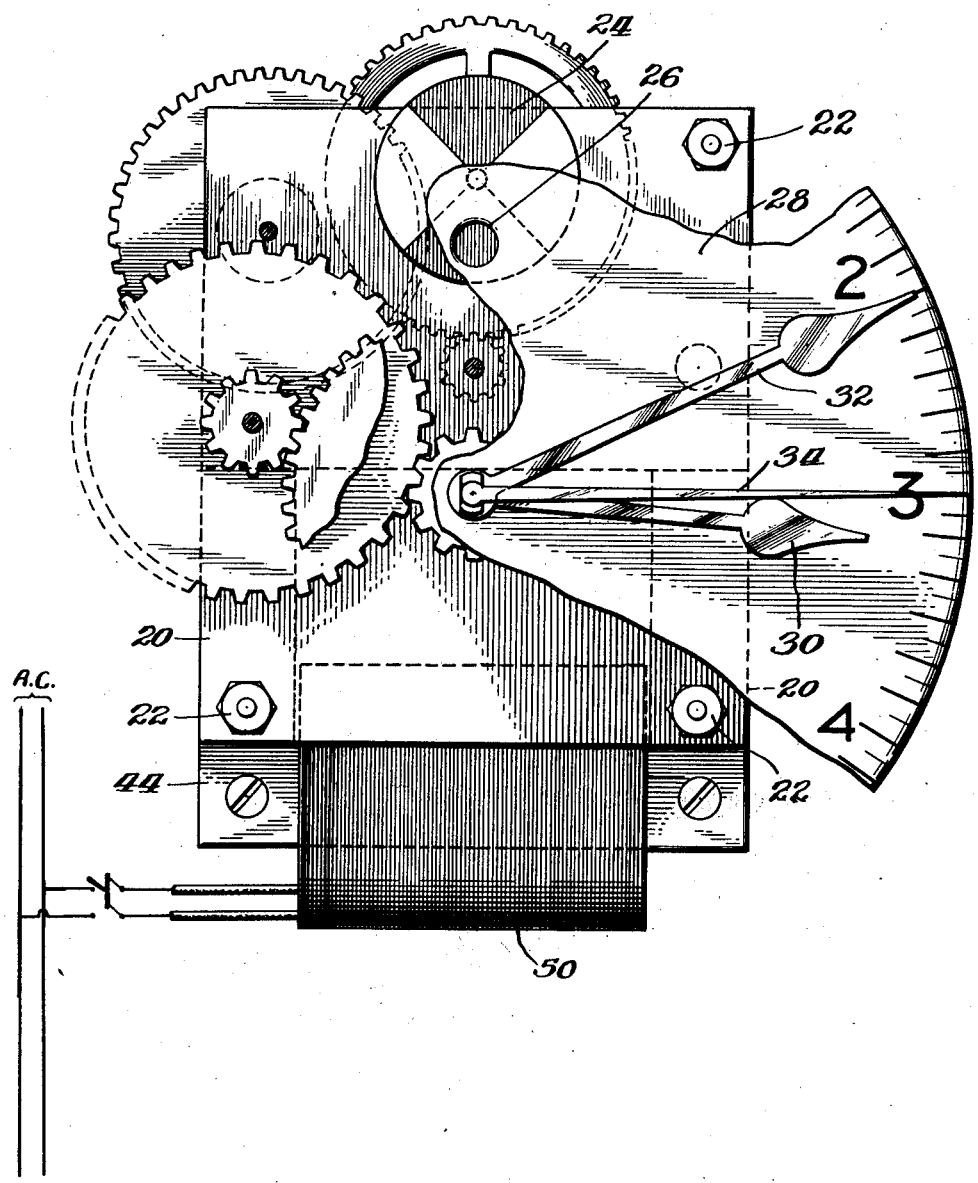
Fig. 1 is a front elevation of a clock incorporating my improved motor, portions of the dial, frame and gears being broken away.

In Fig. 1 I have illustrated the motor as forming a part of a clock which comprises a pair of frame plates 20 joined by bolts 22, and which serve as the frame mounting for a speed reducing gear train not described in detail herein but which may be of any well-known construction such, for example, as that disclosed in my said patent. The clock may have a flasher 24 which has alternating sector-shaped portions thereof painted in contrasting colors. The flasher is fixed to a shaft which makes one or more revolutions per second so that its movement may readily be observed through an aperture 26 formed in the dial 28. The clock is provided with the usual hour and minute hands 30, 32 and a second hand 34.

Figure 2:
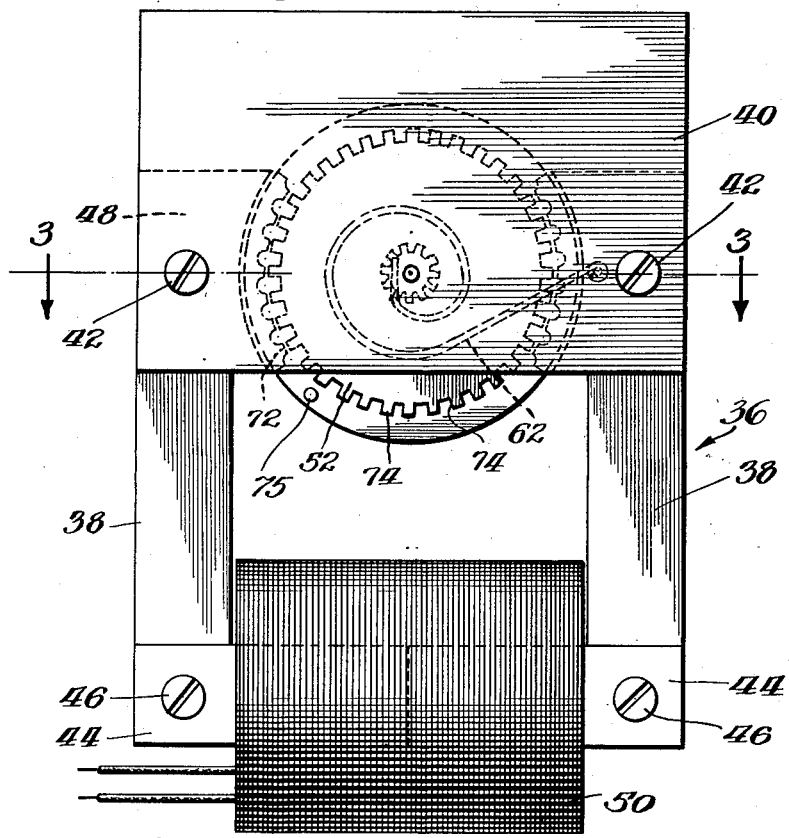
Fig. 2 is a front elevation of the motor per se.

Rigidly secured against one of the plates 20 is a substantially U-shaped laminated core 36 which is formed of similar L-shaped laminations 38 (Fig. 2). The upper ends of the laminations 38 are held in place by plates 40, 41, being rigidly secured thereto by bolts 42. The lower ends of the laminations 38 are bridged by a pair of bars 44, one of which is secured on each side of the group of laminations by bolts 46. The upper ends of the laminations 38 have inwardly projecting arcuate-faced pole portions 48. A coil 50 is wound about the horizontal portions of the L-shaped laminations 38. In the assembly of the coil about the laminations the horizontal portions of the laminations are inserted into the pre-wound coil and held in place by the bars 44.

The rotor 52 is rigidly secured to a pinion 54 which is rotatably mounted upon a shaft 56. One end of the shaft 56 has its bearing in the plate 40, while the other end projects through the hub 58 of a circular plate 60. The hub 58 is mounted for free rotation in the plate 41 but may if desired be restrained from such movement by a spiral torsion spring 62, one end of which is anchored in the hub 58 and the other end of which is secured to a screw 64 threaded in the plate 41.

A pair of segmental movable pole pieces 66, 68 of magnetic material are secured to the face of the plate 60 at its periphery, being spaced therefrom by arcuate separators 70. The outer edges of the segments 66, 68 are in close proximity to the arcuate faces of the pole portions 48 and their inner edges have a plurality of teeth 72 formed therein. These teeth are spaced so that when the movable poles are in their normal operating position as shown in Fig. 2 they will register with teeth 74 formed on the rotor 52. A stop pin 75 is secured in the plate 60 and has its ends projecting outwardly and lying beneath the lower edges of the plates 40, 41 against which it is adapted to abut to limit rotative movement of the plate.

Figure 4:
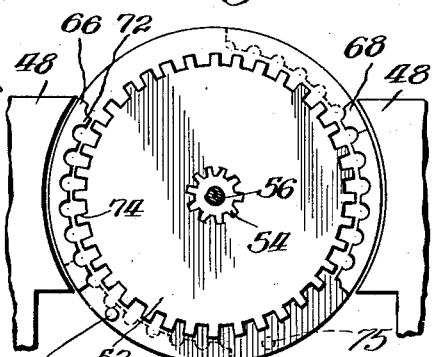
Fig. 4 is a fragmentary sectional view taken on the line 4—4 of Fig. 3.

The spring 62 tends, however, whenever the cool 50 is not energized, to swing the movable pole pieces 66, 68 to the position shown in dotted lines in Fig. 4. The mounting of the plate 60 is such that there will be sufficient friction that the energy dissipated in moving the plate with its movable pole pieces will be greater than the work done in the load. This relationship is of great importance in making the motor capable of automatically falling into step when launched at super-synchronous speed.

As previously intimated, the torsion spring 62 is not a necessary part of the device and the operation of the motor, assuming that the torsion spring is omitted, will now be described. As soon as the current is supplied to the coil 50 the movable pole pieces 66, 68 will be drawn to the position shown in Fig. 2 because of the magnetic attraction of the pole portions 48. The motor is not self-starting and must be manually or otherwise launched at a speed above its normal synchronous speed. This may readily be accomplished by providing one of the higher speed shafts of the clock-work with a knurled thumb piece so that the rotor may easily be spun at the super-synchronous speed. As the rotor slows down from the super-synchronous speed at which it is thus launched there will be a certain reaction between the rotor and the movable pole pieces as the rotor reaches synchronous speed. The energy produced by this reaction is, however, dissipated in friction between the hub 58 and its mounting and in the slight movement of the plate 60 and the attached pole pieces 66, 68 through the magnetic lines of force. This dissipation of energy permits the rotor to "fall in step" and continue operation at synchronous speed. If, due to surges in the current supply or due to other external disturbances, the rotor should tend to fall out of step, the movable pole pieces 66, 68 will move slightly and, due to energy dissipation resulting from this movement, tend to maintain the rotor rotating at synchronous speed. The movable pole pieces also tend greatly to reduce the so-called hunting since part of the forces which tend to produce this hunting are dissipated in the movement of the pole pieces 66, 68 and connected parts and are transmitted only to a very slight extent to the rotor.

If the torsion spring 62 or any other similar means be employed to move the pole pieces out of their normal running position whenever the coil 50 is deenergized, the motor will be self-starting. This operation may be explained as follows: When the coil 50 is energized the pole pieces will be quickly pulled clockwise from the dotted line position shown in Fig. 4 until they are suddenly arrested by the abutment of stop pin 75 with the lower edges of the plates 40 and 41. Due to the magnetic attraction between the teeth 74 of the rotor and the teeth 72 of the pole pieces, the rotor 52 will be given a rotative impulse as the pole pieces 66, 68 thus swing clockwise from the dotted line position, but by the time that the pole pieces are stopped, the rotor will have acquired sufficient momentum to overcome the magnetic attraction of the pole pieces. This rotary movement thus acquired by the rotor will ordinarily be above synchronous speed so that as the rotor slows down from said speed it will fall into step as previously described. When running normally the pole pieces 66, 68 will be substantially in the position in which they are shown in full lines, the pin 75 being spaced sufficiently from the lower edges of plates 40, 41 to prevent the pin from chattering against these plates should there be slight variations in the supply current or in the load on the motor tending to cause oscillation of the pole pieces while the motor is running. The spring 62 is, of course, very light and merely strong enough to move the pole pieces 66, 68 from the full line to the dotted line position (Fig. 4) when the coil is deenergized.

The modified form of motor shown in Figs. 5 and 6 may be similar to that previously described in its general construction and the similar parts will therefore not be described in detail. Similar reference characters will be applied to similar parts. In this construction the upper ends of the L-shaped laminations 80 are secured together by a shouldered bolt 82. The field poles for the motor are in the form of magnetic discs 84, each of which has a projecting tooth 86. These discs are rotatably mounted upon the enlarged portions of the shouldered bolts 82 and are held in light frictional contact with the outer laminations 80 by small coil springs 88 compressed between the heads of bolts 82 and the discs.

The operation of this motor will be substantially the same as that above described except that the energy dissipation will take place between the movable pole pieces 84 and the L-shaped laminations 80. This motor will, of course, not be self-starting but will, when manually or otherwise launched at supersynchronous speed, automatically fall into step as it slows down to its synchronous speed. The movable pole pieces 84 will act in the same manner as the pole pieces 66, 68 of the previously described motor to lessen hunting and to aid in maintaining the motor in operation at synchronous speed upon surges in the current supply or upon other external disturbances.

Figure 3:
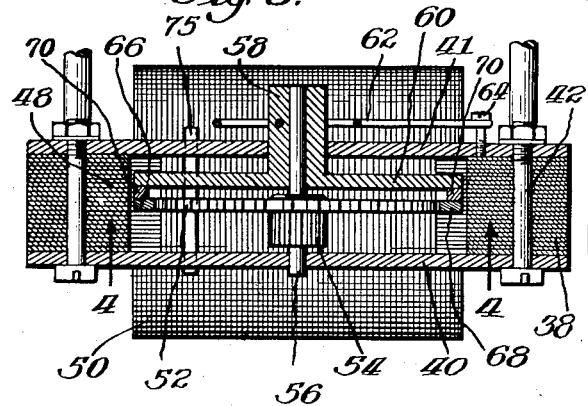
Fig. 3 is a horizontal sectional view taken on the line 3—3 of Fig. 2.

The motor as shown in Figs. 7 and 8 is generally similar to that shown in Figs. 5 and 6 except that it has but one movable pole piece 90 which is mounted for free rotation upon the enlarged portion 92 of a shouldered bolt 94 and is normally held in the position shown by gravity acting upon its pole tooth 96. A spacing washer 98 is positioned between the movable pole and the frame plate 40. The core of the field is composed of a plurality of L-shaped laminations 80 as previously described with reference to Figs. 5 and 6 and a plurality of laminations 38 similar to those used in the motor shown in Figs. 2, 3 and 4. The motor shown in Figs. 7 and 8 will operate in substantially the same manner as the previously described motors, it of course being understood that it is necessary that it be manually launched at a speed above synchronism.

In both the motors shown in Figs. 5 and 6 and in Figs. 7 and 8 it is, of course, necessary that a definite relationship be maintained between the energy dissipated in moving the pole pieces 84, 90, and the work done in the load in order to cause the motor to run. To make the motor capable of automatically starting when launched at super-synchronous speed the energy thus dissipated in the movable pole pieces when the motor falls into step must exceed that consumed in the load at the same time.

While I have illustrated and described particular embodiments of my invention, it will be apparent to those skilled in the art that the principles thereof may be utilized in other embodiments. I therefore do not desire my invention to be limited to the particular embodiments disclosed but desire the following claims to be construed to include such modifications and equivalents as will be apparent to those skilled in the art.

What I claim and desire to secure by Letters Patent of the United States is:

1. In combination, a synchronous motor having a load, and comprising stationary means for producing a magnetic field of periodically varying density, a rotor rotatably mounted in the field produced by said means, and a frictionally mounted pole piece movable between said means and said rotor by magnetic forces and forming a path for the passage of flux from said means to said rotor, the friction tending to prevent movement of said pole piece being sufficiently great that the energy dissipated upon movement of said pole piece will be greater than the energy dissipated in said load during the same interval of time.

2. In combination, a synchronous motor comprising stationary means for producing a magnetic field of periodically varying density, a toothed rotor rotatably mounted in the field produced by said means, and pole pieces frictionally mounted on said means and positioned between said means and said rotor and forming a path for the passage of flux from said means to said rotor, said pole pieces having projecting teeth cooperable with the teeth on said rotor and being movable relative to said means by magnetic forces, the forces tending to prevent movement of said pole pieces being sufficiently great that said pole pieces will be capable of dissipating energy in excess of that capable of being dissipated by said load.

3. In a synchronous motor, the combination of stationary means for producing a magnetic field of periodically varying density, a rotor mounted for rotation in said field, a pair of pole pieces mounted for rotative movement about an axis concentric with that of said rotor and positioned between said rotor and said means so as to conduct the magnetic flux of said field to said rotor, and automatically operable means responsive to magnetic field variations to move said pole pieces partially out of flux conducting position when said first named means are deenergized.

4. In a synchronous motor, the combination of stationary means for producing a magnetic field of periodically varying density, a rotor mounted for rotation in said field, a pair of pole pieces mounted for rotation by magnetic forces about an axis concentric with that of said rotor and positioned between said rotor and said means so as to conduct the magnetic flux of said field to said rotor, and means for impeding movement of said pole pieces.

5. In a synchronous motor, the combination of relatively stationary means for producing and conducting a magnetic flux of periodically varying density, a movable pole piece frictionally connected to said means, a rotor, cooperating teeth on said rotor and pole piece, and resilient means to move said pole piece partially out of the path of dense magnetic flux when said first named means are not energized.

6. In a synchronous motor, the combination of a stationary field piece having two projecting portions, a toothed rotor of magnetic material positioned between said portions, a member mounted for rotary movement about an axis concentric with that of said rotor, and a pair of pole pieces, carried by said member and forming magnetic bridges between said portions and said rotor, said pole pieces and member being movable in response to magnetic forces exerted upon said pole pieces.

7. In a synchronous motor, the combination of a stationary field piece having two projecting portions, a toothed rotor of magnetic material rotatably mounted between said portions, a member including a pole piece carried by said member forming a magnetic bridge between one of said portions and said rotor, said member and pole piece being mounted for relatively free rotary movement about an axis concentric with that of said rotor by the effect of magnetic forces acting thereon.

8. In a synchronous electric motor, the combination of a relatively stationary field member, means to cause a magnetic flux of varying density in said member, a toothed rotor rotatable in the magnetic field of said member, and a pole piece positioned between said member and said rotor to direct the magnetic field from said member to said motor, said pole piece being movable by magnetic forces relatively to said field member and being mounted so as to have its movement frictionally retarded.

9. In a synchronous motor, the combination of relatively stationary means for producing and conducting a magnetic flux of periodically varying density, a pole piece associated with said means and substantially freely movable relative thereto by magnetic forces, a rotor, and cooperating teeth on said rotor and pole piece.

10. In a synchronous electric motor, the combination of a relatively stationary core, means to cause a magnetic flux of periodically varying density in said core, a toothed rotor rotatable in the magnetic field of said core, and a pole piece having a plurality of teeth corresponding to the teeth on said rotor and positioned between said core and said rotor and movable relative to said core, and yieldable means normally holding said pole piece away from said core when the latter is not energized.

11. In a synchronous motor, the combination of relatively stationary means for producing and conducting a magnetic flux of periodically varying density, a movable pole piece frictionally connected to said means, a rotor, cooperating teeth on said rotor and pole piece, resilient means to move said pole piece partially out of the path of dense magnetic flux when said first named means are not energized, and a stop to limit the movement of said pole piece.

12. In a synchronous electric motor, the combination of a relatively stationary core, means to cause a magnetic flux of periodically varying density in said core, a toothed rotor rotatable in the magnetic field of said core, and a pole piece having a plurality of teeth corresponding to the teeth on said rotor and positioned between said core and said rotor and movable relative to said core, yieldable means normally holding said pole piece away from said core when the latter is not energized, and means to limit movement of said pole piece relative to said core.

13. In a synchronous motor for time-keeping devices, the combination of means for producing a magnetic flux of periodically varying density, a pair of toothed pole pieces supported for oscillatory movement in the magnetic field of said means and movable under the influence of the magnetic forces of said field, a rotor having teeth cooperable with the teeth of said pole pieces, and means for impeding the movement of said pole pieces.

14. In a synchronous motor for driving clocks and the like, the combination of a relatively stationary field coil, a toothed rotor, and means for facilitating manual starting and reducing hunting comprising a toothed pole piece mounted for movement by the effect of magnetic forces in a path proximating that of the periphery of said rotor at the point thereof nearest the pole piece and operable to conduct magnetic flux from said coil to said rotor.

15. A synchronous motor for time-keeping devices comprising a fixed magnetic field producing means, a toothed rotor, a movable toothed pole piece forming a magnetic flux path from said means to said rotor and movable by magnetic forces, and resilient means for holding said movable pole piece in a predetermined position and to oppose movement thereof by the forces of the magnetic field produced by said first named means.

16. In a synchronous motor, the combination of a stationary coil, a toothed rotor, and a movable pole piece positioned in the flux path of said coil and closely adjacent the periphery of said rotor, said pole piece being mounted for substantially free movement by the influence of the flux set up by said coil in a direction in part tangential to the path of the periphery of said rotor, whereby said motor will continue running through brief current interruptions.

17. A synchronous motor for time-keeping devices comprising a fixed magnetic field producing means, a toothed rotor mounted for free rotation, and a pole piece movable by the force of magnetism produced by said means and positioned for conducting magnetic flux from said means to said rotor, said pole piece having a toothed part movable in a path having an appreciable directional component tangential to the adjacent portion of the periphery of said rotor, whereby said motor will be capable of automatically falling into step at synchronous speed when decelerating from a super-synchronous speed at which it may have been launched.

18. A synchronous motor for time-keeping devices operable from a commercial source of alternating current comprising a fixed magnetic field producing means having a coil connected to said source, a toothed rotor positioned in the field of said means, and a relatively light weight toothed pole piece mounted for movement between said means and said rotor by the influence of magnetic forces produced by said means, forming a flux transmitting medium therebetween, and constituting means for aiding said rotor to fall in step at synchronous speed when decelerating from super-synchronous speed.

19. In a synchronous motor, the combination of a relatively stationary magnetic field producing means, a toothed rotor, and means for facilitating manual starting of said rotor and minimizing hunting comprising a pair of arcuately shaped pole pieces having teeth formed on their inner edges and mounted for oscillatory movement about the axis of said rotor between the periphery of said rotor and said means, whereby said pole pieces will be effective to conduct the magnetic flux from said means to said rotor and to move slightly under the influence of magnetic forces when said motor falls into step at synchronous speed and when there is a variation in the load or voltage of the current passing through said means.

20. In a synchronous motor, the combination of a stationary means for producing and conducting a magnetic flux of periodically varying density, a rotor, a pole piece mounted for movement relative to said means, said pole piece being movable in a path proximating that of the adjacent portion of the periphery of said rotor under the effect of the magnetism produced by said means, and co-operating teeth on said rotor and said pole piece.

21. In a synchronous motor, the combination of stationary means for producing and conducting a magnetic flux of periodically varying density, a substantially freely movable pole piece carried by said means, a rotor, and cooperating teeth on said rotor and pole piece, said pole piece being movable in a path proximating the adjacent portion of the periphery of said rotor solely by the effect of the magnetic forces acting thereon.

22. A manually startable synchronous motor comprising a relatively stationary field coil, a toothed rotor, a toothed pole piece mounted for relatively free movement under the influence of magnetism from said coil in a path proximating the periphery of said rotor at a point adjacent the pole piece and operable to conduct magnetic flux from said coil to said rotor, and yielding means to hold said pole piece in a predetermined position.

23. In a synchronous alternating current motor, a stationary frame, a coil fixed thereto, a toothed magnetic rotor mounted for rotation relative to said frame, and a movable magnetic pole piece carrying flux from said coil to said rotor, said pole piece being movable relative to said frame under the effect of magnetic forces upon any change of speed of said rotor.

24. In a synchronous alternating current motor, a stationary frame having a coil fixed thereto, a toothed rotor of magnetic material mounted for rotation relative to said frame, said coil and frame having a relatively great moment of inertia with respect to the rotating parts, and a pole piece for carrying magnetic flux from said coil to said rotor, said pole piece having a small moment of inertia and being movable relative to said frame by the influence of magnetic forces exerted by said coil.

25. In a synchronous alternating current motor, a stationary frame, a coil fixed thereto, a toothed rotor mounted for rotation relative to said frame, and a movable magnetic pole piece carrying magnetic flux from coil to said rotor, said pole piece being mounted for relatively free motion about the axis of said rotor by the influence of magnetic forces acting thereon.

26. In a synchronous alternating current motor, a stationary frame, a coil fixed thereto, a toothed rotor mounted for rotation relative to said frame, a movable magnetic pole piece carrying flux from said coil to said rotor, said pole piece being movable relative to said frame in a path concentric with axis of said rotor under the effect of magnetic forces, and resilient means to hold said pole piece in a predetermined position.

27. In a synchronous alternating current motor, a stationary frame, a coil fixed thereto, a toothed rotor mounted for rotation relative to said frame, and a pair of movable magnetic pole pieces for carrying flux from said coil to said rotor, said pole pieces being connected for movement as a unit relative to said frame member by the influence of magnetic forces exerted by said coil.

28. In a synchronous alternating current motor, a stationary frame, a coil fixed thereto, a toothed rotor mounted for rotation relative to said frame, a core for said coil having arcuate faces adjacent said rotor and concentric with the axis thereof, and a pair of arcuate magnetic segments having teeth formed upon their inner surfaces for cooperation with the teeth of said rotor, said magnetic segments being mounted for movement about the axis of said rotor under influence of magnetic forces.

29. In a synchronous alternating current motor, a stationary frame, a coil fixed thereto, a toothed rotor mounted for rotation relative to said frame, a core for said coil having arcuate faces adjacent said rotor and concentric with the axis thereof, a pair of arcuate magnetic segments having teeth formed upon their inner surfaces for cooperation with the teeth of said rotor, said magnetic segments being mounted for movement about the axis of said rotor under the influence of magnetic forces, and a resilient connection between said magnetic segments and said frame.

30. In a synchronous alternating current motor, the combination of a stationary frame, a coil secured thereto, a toothed rotor mounted for rotation relative to said frame, a core for said coil having an arcuate pole face for cooperation with said rotor, a single toothed pole piece mounted for swinging movement adjacent said rotor and serving as a flux path between said core and said rotor and movable relative to said core by the influence of magnetic forces exerted by said coil, and means to impede movement of said pole piece.

31. In a synchronous alternating current motor, the combination of a frame having a coil fixed thereto, a toothed magnetic rotor mounted for rotation relative to said frame, and a pair of pole pieces independently movable relative to said frame and to each other by the influence of magnetic forces exerted by said coil and arranged normally to conduct magnetic flux from said coil to said rotor.

In witness whereof, I hereunto subscribe my name this 25th day of July, 1930.

LAURENS HAMMOND.